Aug. 30, 1960

S. HILLMAN 2,950,894

AUTOMATIC PACKAGING MACHINE

Filed Oct. 1, 1956

S. HILLMAN

2,950,894

AUTOMATIC PACKAGING MACHINE

Filed Oct. 1, 1956

INVENTOR
Swan Hillman
by Carlson, Pitzner, Hubbard & Wolfe
ATTORNEY

Aug. 30, 1960    S. HILLMAN    2,950,894
AUTOMATIC PACKAGING MACHINE
Filed Oct. 1, 1956    6 Sheets-Sheet 5

INVENTOR
Swan Hillman
by Carlson, Pitzner, Hubbard & Wolfe
ATTORNEY

United States Patent Office 2,950,894
Patented Aug. 30, 1960

2,950,894

AUTOMATIC PACKAGING MACHINE

Swan Hillman, % Rockford Screw Products Co.,
2501 9th St., Rockford, Ill.

Filed Oct. 1, 1956, Ser. No. 613,192

6 Claims. (Cl. 249—2)

This invention relates generally to a machine for counting and packaging a predetermined number of irregularly shaped articles such as screws, nuts and the like. More particularly, the invention relates to an article counting machine in which the articles are delivered to a scale at a fast or bulk rate until they reach a weight slightly less than that of the desired number of articles and then, at a slower dribble rate until the delivered articles are equal in weight to the desired number.

The primary object of the invention is to provide a machine of the above character capable of counting the desired number of articles accurately in less time than has been possible heretofore.

Another object is to shorten the time required for the counting operation by providing a novel bulk feed mechanism which, compared to similar prior mechanisms, delivers irregular articles at a faster, more uniform and more closely controlled rate thereby enabling the bulk weight not only to be reached more quickly, but also, to be brought closer to the desired weight thereby reducing the number of articles to be delivered at the slower dribble rate.

A further object is to provide a novel bulk feed mechanism in which a fast, closely controlled feed rate is achieved by delivering articles in a fluctuating stream to distributing mechanism which advances the articles toward the scale and, during such advance, arranges the articles in a single layer and a plurality of rows constituting a uniform stream.

A more detailed object is to interpose between the scale and a feeder which delivers articles in successive piles a distributing mechanism having an abrupt ledge and means for arranging the piles of articles in single layer rows while advancing the same toward and off of the ledge.

A further detailed object is to provide a novel pile or batch feeder which accommodates articles of different sizes and shapes and is actuated in timed relation to the distributor to correlate the average rate of delivery of articles in piles with the fastest rate of advance of the articles over the distributor ledge in single layer rows.

The invention also resides in the novel construction and mounting of the dribble feed mechanism to enable elongated articles of different lengths to be delivered at the same dribble rate.

Other objects and advantages of the invention will become apparent from the following detailed description taken in connection with the accompanying drawings, in which.

While the present invention is applicable to the packaging of different numbers of a wide variety of irregularly shaped small articles such as nuts, rivets and the like, it is shown in the drawings for purposes of illustration embodied in a machine for counting and packaging a gross of screws 11. In the exemplarly machine, the screws are counted in a weighing operation during the first part of which slightly fewer screws than a gross are delivered by a bulk feed mechanism 12 into an upwardly opening hopper 13 rigid with the movable platform 14 of a scale 15. Then, additional screws are delivered to the hopper one by one by a dribble feed mechanism 16 which is stopped when the weight of the screws in the hopper is equal to the weight of a gross.

Movement of the platform 14 under the increasing weight of the screws 11 delivered to the hopper 13 by the feed mechanisms 12 and 16 is utilized to control the latter for stopping the bulk feed when a weight close to but less than that of a gross is reached and the dribble feed when a gross of screws has been delivered to the hopper. In the present instance, movement of the scale platform to the different positions corresponding to the bulk and gross weights is detected by two photoelectric cells 17 and 18 (Fig. 9) mounted on a housing 19 for the scale on opposite sides of a stationary incandescent lamp 20 and adjacent the paths of the laterally spaced legs or vanes 21 and 22 of a U-shaped sensing element 23. An arm 24 movable with the scale platform supports the vanes for movement downwardly between the lamp and the photocells when the platform rises to an upper empty position and upwardly to uncover the cells successively as screws are delivered by the feed mechanisms and the platform descends under the increasing weight. To vary the positions of the platform at which the photocells are uncovered, each photocell is adjustable individually relative to the lamp and along the path of the associated vane, such adjustment being effected herein by mounting each cell on a slide 26 reciprocable along a stationary guide 27 on the scale housing by turning a screw 28 threaded into the slide and rotatable but fixed against axial movement relative to the housing. Two amplifiers 25 connected individually to the photocells vary the energization of relays 1R and 2R for control of the feed mechanisms in response to signals from the photocells.

Figure 2:
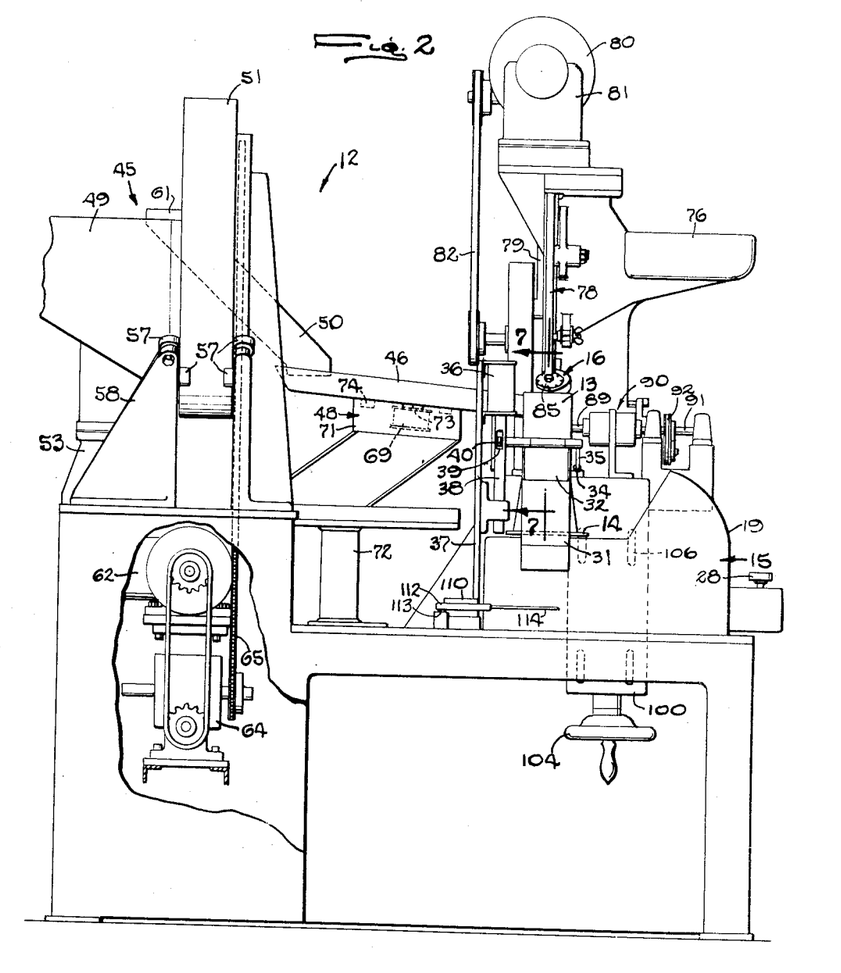
Figure 2 is a fragmentary side elevational view of the machine with some of the parts broken away.
Figure 3:
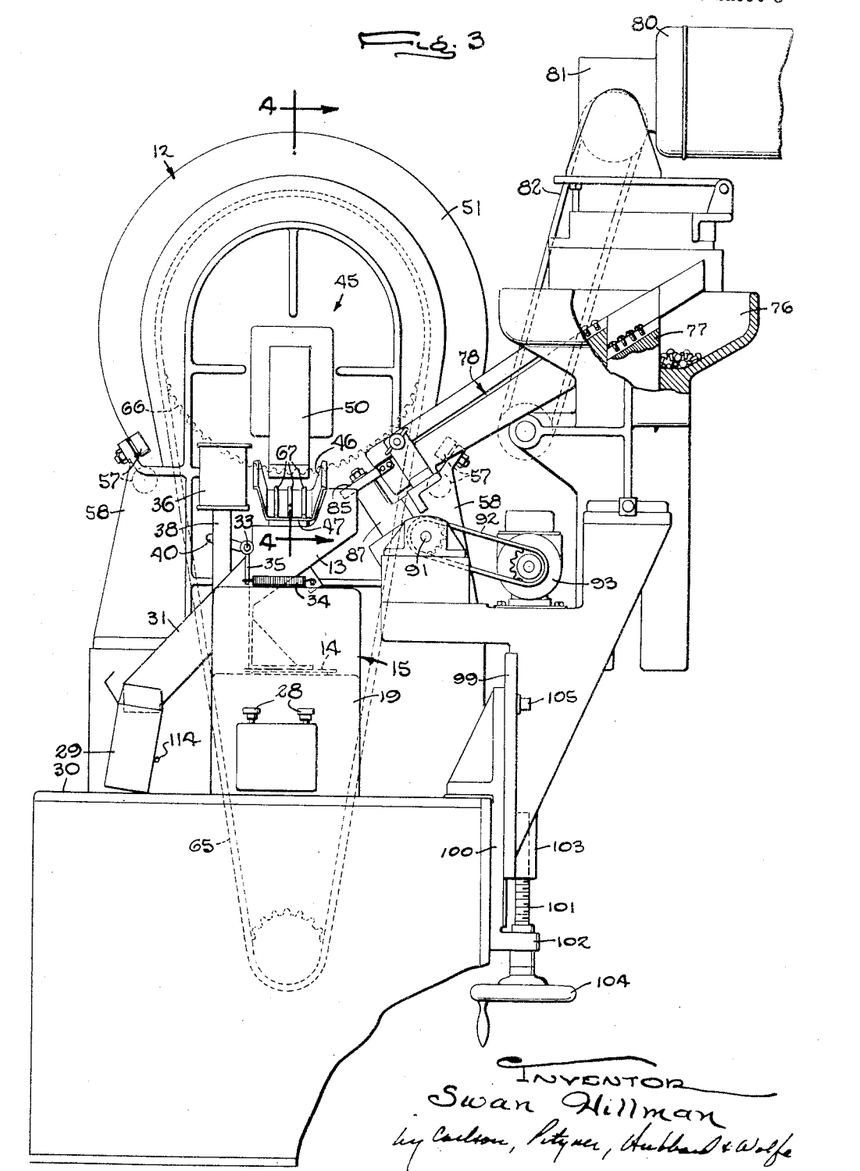
Fig. 3 is an end view of the machine with some parts broken away.
Figure 4:
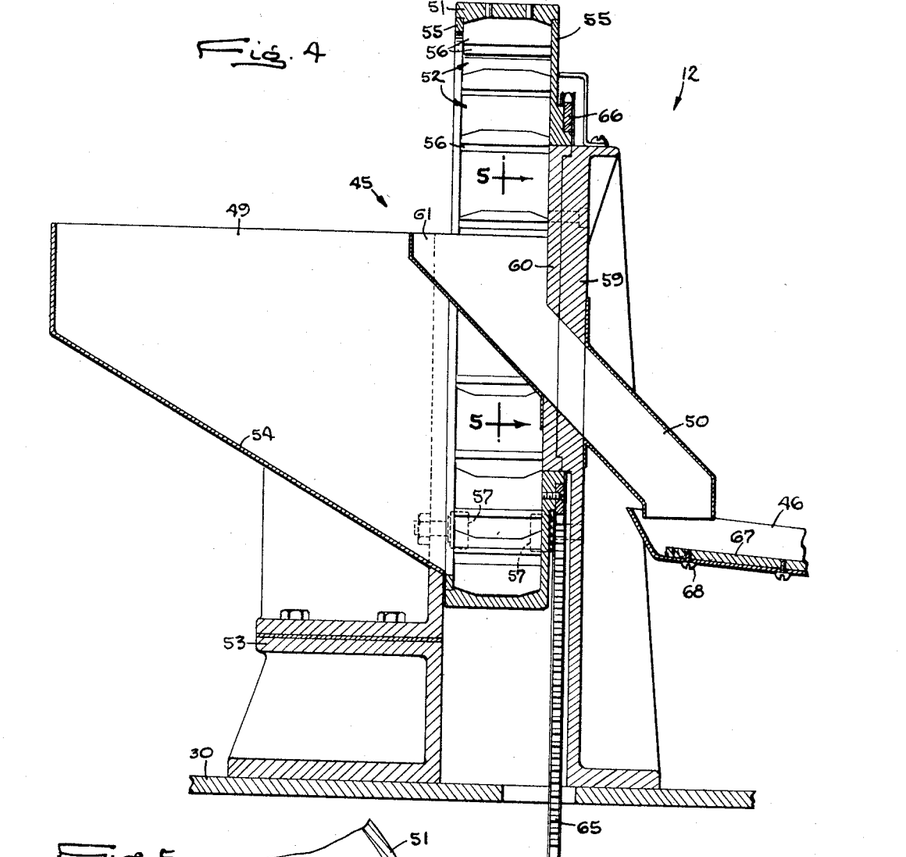
Fig. 4 is a fragmentary sectional view of the bulk feeding mechanism taken along the line 4—4 of Fig. 3.
Figure 7:
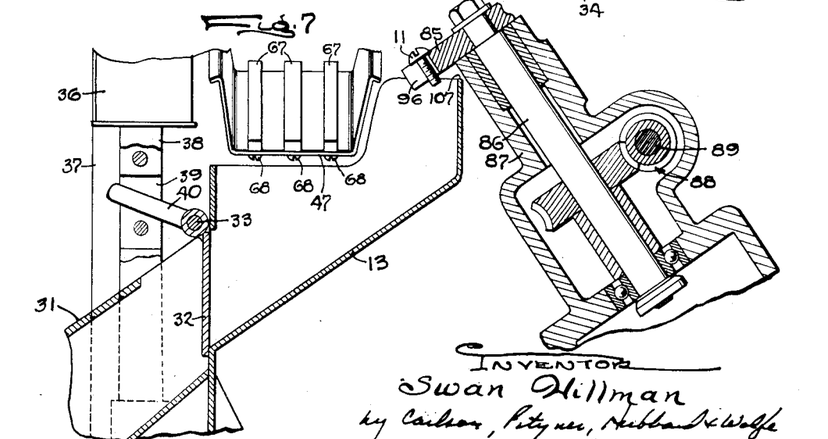
Fig. 7 is a fragmentary sectional view taken along the line 7—7 of Fig. 2.

Screws 11 collected in the scale hopper 13 during the weighing operation are discharged by gravity into a carton 29 or other suitable container in which they are to be packaged. Herein, the carton rests on a frame table 30 supporting the scale 15 and is positioned beneath the lower end of a chute 31 rigid with and extending downwardly from one side of the scale hopper and having a bottom wall substantially alined with and inclined downwardly from a similar bottom wall of the hopper (Figs. 3 and 7). Discharge of the screws from the latter is controlled by a gate or door 32 forming a part of one side wall of the hopper and pivoted thereon at 33 for swinging about a horizontal axis between a vertical closed position shown in Figs. 3 and 7 and an upper open position in which screws gravitate off of the bottom wall of the hopper and into the chute. A spring 34 stretched between the hopper and an arm 35 Figs. 2 and 3) rigid with the door yieldably urges the door into its closed position. Swinging of the door to its open position is effected in this instance by a pressure fluid actuator 36 having a cylinder mounted on a post 37 upstanding rigidly from the table 30 (Fig. 2) and a piston whose rod 38 is slotted at 39 (Fig. 7) to receive another arm 40 rigid with the door and projecting horizontally therefrom. The admission of pressure fluid to opposite ends of the cylinder from a line 41 connected to a suitable source of pressure fluid (not shown) is controlled by a so-called four-way valve 42 (Fig. 9) whose movable element is shifted from one end position to the other by selective energization of open and close solenoids 43 and 44.

*Bulk feed mechanism*

To shorten the time required for counting each gross of screws 11 and thereby increase the rate of packaging of predetermined numbers of such irregularly shaped articles over what has been possible heretofore, the present invention contemplates a novel construction of the bulk feed mechanism 12 for delivery of screws to the scale hopper 13 at a rate which is fast yet closely controlled to enable the bulk feed to be stopped accurately when the weight of the screws delivered by the mechanism is just slightly less than that of the desired gross. Delivery of the remaining screws to complete the gross then may be accomplished in a short time even though the rate of such delivery by the dribble feed mechanism 16 is comparatively slow.

In accordance with the invention, the bulk feed mechanism 12 (Figs. 2 to 7) comprises a feeder 45 for depositing screws 11 in an uneven stream on an upwardly facing surface of an elongated carrier 46 interposed between the feeder and the scale hopper 13 and having an abrupt ledge 47 positioned above the hopper. Power actuated means 48 cooperates with the carrier to agitate the screws deposited thereon and, while advancing the screws toward and off of the ledge, to distribute the same in a plurality of single layer rows. The average rate of delivery of screws by the feeder 45 is correlated with and made approximately equal to the maximum rate at which the rows of screws may advance over the ledge in single layers and still be cut off sharply upon deenergization of the power actuated means. The stream passing the ledge thus is substantially continuous and uniform for accurate determination of the numbers of screws delivered before cut-off of the stream.

Correlation of the average rate of deposit of screws 11 on the carrier 46 with the rate of advance of screws over the ledge 47 thereof is obtained by constructing the feeder 45 to deliver the screws in a succession of piles or batches of approximately the same size in timed relation to energization of the power actuated means 48 for the carrier. To this end, the feeder comprises an upwardly opening hopper 49 for storing a plurality of gross of screws, a downwardly inclined chute 50 terminating above the carrier at a point spaced from the ledge 47, and a member 51 having a plurality of pockets 52 for picking up the individual batches and transferring the same successively to the chute for gravitation along the latter and onto the carrier.

Figure 5:
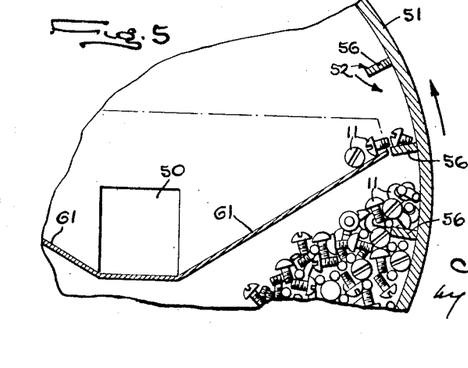
Fig. 5 is a fragmentary sectional view taken along the line 5—5 of Fig. 4.
Figure 6:
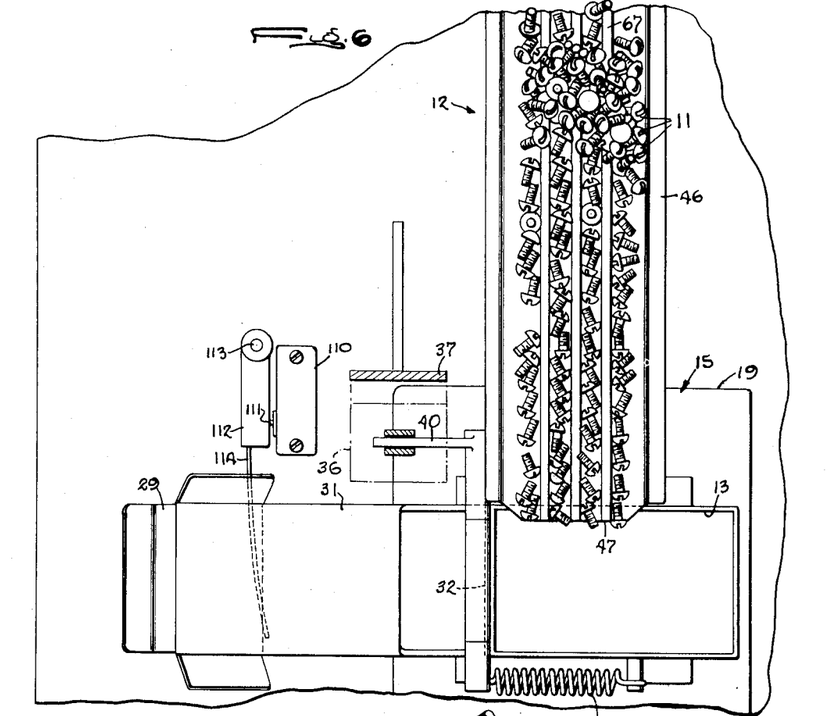
Fig. 6 is a fragmentary plan view of the distributor chute and the scale hopper.

The bulk hopper 49 is supported on a platform 53 rigid with the frame table 30 and includes a downwardly inclined bottom wall 54 (Fig. 4) along which the screws slide into the pockets 52. The latter open inwardly from the inner periphery of a cylinder constituting the pick-up member 51 and are defined by the cylinder, inturned flanges 55 at the ends of the cylinder and a plurality of radially disposed flights or paddles 56 projecting rigidly from the inner periphery of the cylinder. To carry the pockets upwardly away from the lower edge of the hopper wall 54, the cylinder is supported for rotation about a horizontal axis by a plurality of rollers 57 (Figs. 2 and 3) journaled on rigid upstanding frame members 58 and a supporting plate 59 and engageable with the outer periphery and ends of the cylinder. Also, an annular bearing plate 60 (Fig. 4) rigid with the supporting plate 59 is journaled in the inner periphery of the outer one of the flanges 55. The chute 50 is rigid with and is inclined downwardly through the bearing and supporting plates 59 and 60 with upwardly flaring side walls 61 disposed within the cylinder and projecting outwardly to a position adjacent the path of the flights to receive screws gravitating from the pockets 52 as the latter move upwardly about the cylinder axis and are turned to open downwardly as shown in Fig. 5.

With the batch feeder 45 described above, variation in the average rate of delivery of screws 11 and accommodation of screws of different sizes is obtained simply by varying the speed of rotation of the pick-up cylinder 51 and thereby the frequency of deposit of the batches in the chute 50. In the present instance, the cylinder is rotated by a variable speed motor 62 (Figs. 2 and 9) which is energized through a controller 63 for varying its speed and is connected through a speed reducing gear box 64 and a chain 65 to a sprocket 66 bolted to the outer one of the inturned flanges 55 on the cylinder.

The carrier 46 for distributing the piles of screws discharged by the feeder 45 in this instance is a downwardly inclined chute supported on the table 30 with its upper end portion beneath the lower end of the feeder chute 50 and its lower end constituting the ledge 47 which is located directly above the scale hopper. To arrange the screws in rows, baffle members 67 project upwardly from the bottom of the chute and extend longitudinally thereof to define parallel channels or grooves into which the screws fall during their advance along the chute. Herein, the baffles are continuous straight ribs of rectangular cross section secured as by screws 68 to a flat bottom wall of the chute and laterally spaced apart a distance wider than the maximum diameter of the screws to be packaged to enable the screws to fall between the ribs. However, the spacing of the ribs is less than the length of the screws to prevent jamming of the screws and to receive the same with their axes extending longitudinally of the chute. Herein, there are three ribs cooperating with upstanding side walls of the chute to define four channels, the number of ribs and the spacing thereof being changed to accommodate different sizes of screws.

Figure 1:
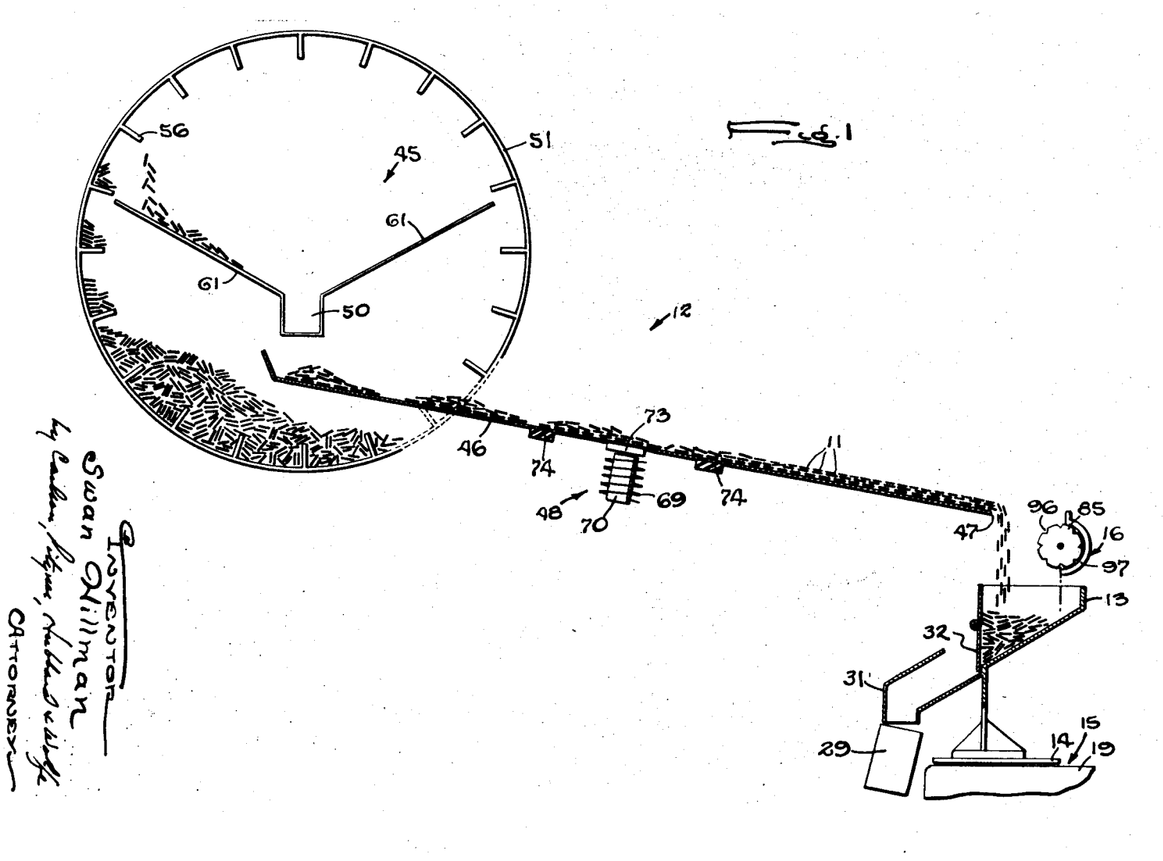
Figure 1 is a diagrammatic view of a packaging machine embodying the novel features of the present invention.

While the power actuated means 48 for the distributing chute 46 may take various forms, herein, it is a vibrating mechanism for reciprocating the chute vertically through a narrow range and agitating the screws so that the latter gravitate along the chute and tend to settle into the channels between the ribs 67. The vibrator comprises a coil 69 (Figs. 1 and 9), a magnetic core 70 encircled by the coil and mounted stationarily therewith inside of a housing 71 (Fig. 2) rigid with stationary frame members 72, and a magnetic armature 73 secured to the underside of the chute. Blocks 74 of resilient material such as rubber secured on opposite sides to the vibrator housing and the chute support the latter in a position in which the armature is spaced a short distance from the coil as shown in Fig. 1 when the coil is deenergized. Upon energization of the coil, the armature is attracted to the core and the blocks are compressed, the blocks expanding to move the armature and the chute upwardly away from the coil upon deenergization of the coil. The period of vibration of the chute and the angle of inclination thereof are such that forward advance of screws along the chute stops abruptly when the coil is deenergized.

To simplify the control of the bulk feed mechanism 45, screws are deposited on the distributor chute 46 only during discharge of screws from the latter. This is accomplished simply by connecting the vibrator coil 69 and the controller 63 for the bulk feed motor 62 in parallel circuits for energization and deenergization of the motor and the coil in unison with each other, the circuit through the coil also including a rectifier 75.

Dribble feed mechanism

Figure 8:
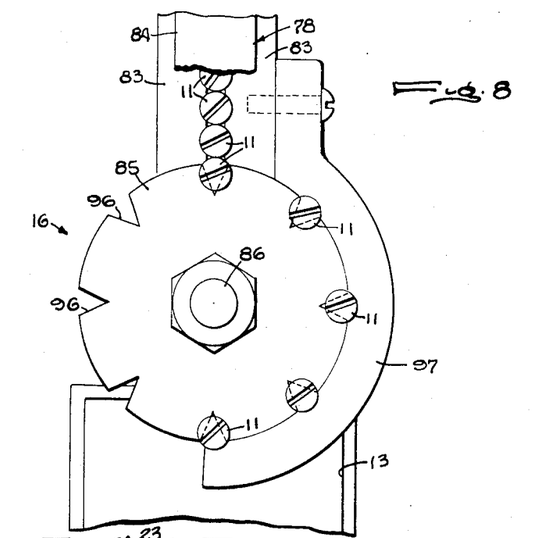
Fig. 8 is a fragmentary plan view of the dribble feed mechanism.

Screws 11 to be delivered by the dribble feed mechanism 16 (Figs. 2, 3, 6 and 8) are stored in a separate hopper 76 from which an elevator 77 (Fig. 3) in the form of a block reciprocable along a vertical wall of the hopper raises small groups of the screws to the upper end of a downwardly inclined track 78 for receiving the screws and arranging the same in a single row. Reciprocation of the elevator is effected by a crank 79 which is driven by a motor 80 through suitable speed reducing mechanism 81 and a belt 82. In the track 78 (Fig. 8), two plates 83 horizontally spaced apart a distance wider than the shanks of the screws but narrower than the heads engage the undersides of the latter and are inclined at a sufficient angle that the screws slide toward the lower end of the track while remaining substantially upright. The upper end portion of the track within the hopper is exposed to receive screws from the elevator but the lower end portion thereof outside of the hopper is covered by a plate 84 secured to the track plates 83 and spaced from their upper edges to retain the screws in the track without impeding their free downward sliding movement.

Figure 9:
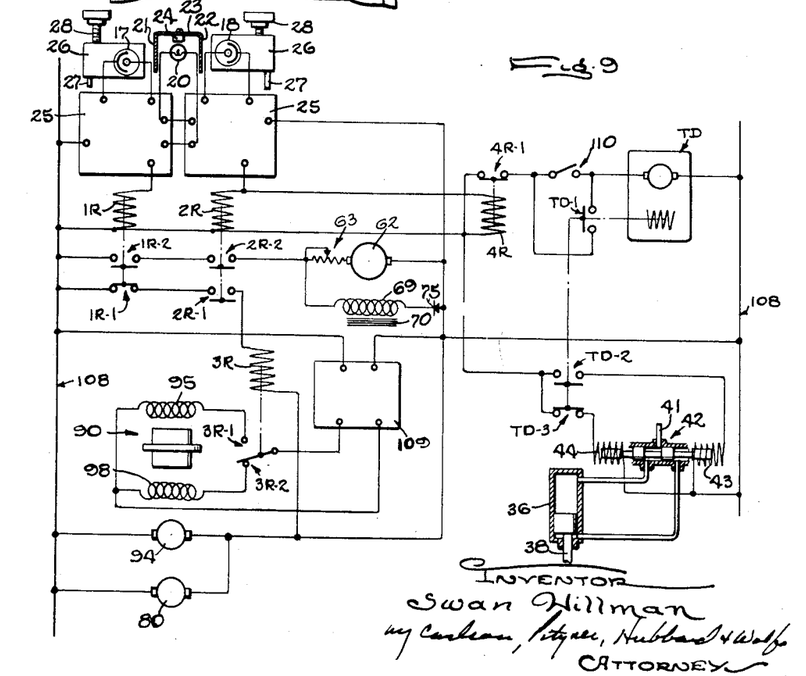
Fig. 9 is a schematic view and wiring diagram of the circuits for controlling the automatic sequence of weighing operations.

At the lower end of the track 78, the screws 11 therein are picked up one by one by a feeder 85 and transferred to a discharge position where they are released for gravitation directly into the scale hopper 13. In this instance, the feeder is formed as an annular disk which is secured to the upper end of an upwardly inclined shaft 86 (Fig. 7) journaled in a casing 87 and connected through a worm and worm wheel 88 to a shaft 89. The latter is coupled through an electromagnetic clutch and brake unit 90 to another shaft 91 which is connected through a chain 92 to the output member of a suitable mechanical variable speed drive 93 (Fig. 3) whose input member is driven continuously by an electric motor 94 (Fig. 9). The disk is supported between the scale hopper and the lower end of the track with its axis substantially normal to the latter and, when a clutch winding 95 of the clutch and brake unit 90 is energized for rotation of the disk, V-shaped recesses 96 opening radially and outwardly from its periphery are moved successively from a pick-up position of alinement with the lower end of the track to the discharge position above the hopper. As each recess passes the pick-up position, the end screw of the row in the track gravitates into the recess where it is held by an arcuate retainer bar 97 bolted to the track 78 and extending therefrom approximately 180 degrees around the periphery of the disk. When the screw passes the end of the bar which defines the discharge position, it falls out of the recess and directly into the scale hopper 13.

The dribble feed is terminated by energizing a brake winding 98 of the clutch and brake unit 90 to apply a retarding torque to the feeder shaft 89 and by deenergizing the clutch winding 95 when the weight of screws in the scale hopper 13 as detected by the photoelectric cell 18 reaches that of the desired gross. Herein, the circuits to the clutch and brake windings are controlled by a relay 3R connected in series with normally open contacts 2R-1 of the dribble relay 2R and normally closed contacts 1R-1 of the bulk relay 1R and having contacts 3R-1 and 3R-2 in the circuits of the clutch and brake windings.

To insure that no more screws are delivered after the gross weight is reached, not only are the scale 15 and its control unit sensitive enough to detect a change in weight equal to that of an individual screw, but also, the time interval between the discharge of successive screws from the feeder disk 85 is correlated with and made at least as long as the response time of the scale and dribble feed control mechanisms. Such response time is the period required for stopping the dribble feed after discharge from the disk of the last screw needed to complete the gross and depends on the distance through which the screw falls before its weight is detected and the time required after such detection for the clutch and brake unit 90 to become effective to stop the disk. The time interval between successive screws discharged from the disk, being dependent on the speed of rotation of the disk and the spacing of adjacent recesses 96 thereon, may be varied by adjustment of the variable speed drive 93 and preferably is brought as close as possible to the response time of the scale and dribble feed control mechanisms for shortening the dribble feed time while insuring an accurate count.

In accordance with another aspect of the present invention, the dribble feed mechanism 16 is mounted in a novel manner to accommodate screws of different sizes and maintain substantially the same response period of the scale 15 and the clutch and brake unit 90 so that the rate of delivery of screws by the feeder disk 85 also may be the same. For this purpose, the parts of the dribble feed mechanism, particularly the disk, are adjustable up and down longitudinally of the upright axes of the screws in the disk to locate the lower ends of the screws of each length being handled approximately the same distance above the scale hopper. In the present instance, this is accomplished by mounting all of the parts of the dribble feed mechanism including the hopper 76 with the elevator 77 and its drive motor 80, the track 78, the disk 85, and the disk drive including the motor 94 all on a slide 99 supported on the frame table 30 for adjustment vertically of the latter. Thus, stationary guideways 100 on the table slidably receive the slide and a screw 101 journaled on but fixed against axial movement relative to a ledge 102 rigid with the guideways is threaded into a nut 103 on the slide to raise and lower the same by turning a handwheel 104 fast on the screw, the slide being clamped to the guideway by bolts 105 (Fig. 3) extending through vertical slots 106 in the slide (Fig. 2). Herein, the vertical position of the disk 85 is adjusted so that the lower ends of screws 11 in the recesses 96 just clear the upper edge 107 of the scale hopper 13 as shown in Fig. 7 during rotation of the disk to carry the screws to the discharge position.

Operation

In the operation of the improved packaging machine, let it be assumed that power supply lines 108 (Fig. 9) are connected to a suitable source of alternating current (not shown) and that a cycle has just been completed with a gross of screws in the scale hopper 13 and the close solenoid 44 of the valve 42 energized to hold the scale hopper gate 32 in its closed position. At this time, both photoelectric cells 17 and 18 are uncovered by the vanes 21 and 22 and their relays 1R and 2R are deenergized for interruption of the circuits to the controller 63 for the bulk feed motor 62 and to the vibrator coil 69 at normally open contacts 1R-2 and 2R-2. Also, the circuit through the clutch-brake relay 3R is interrupted at the normally open contacts 2R-1 of the dribble control relay 2R so that a circuit to the brake winding 98 is completed between the lines 108 and through a rectifier 109 and normally closed contacts 3R-2 of the clutch-brake relay. The energizing circuit for the clutch winding 95 then is interrupted at the normally open contacts 3R-1 of the relay 3R. Thus, the feed by both the bulk and dribble mechanisms 12 and 16 is stopped. Being connected directly between the supply lines 108, the dribble feed motors 80 and 94 are energized continuously.

Placement of the carton 29 on the table 30 beneath the lower end of the hopper chute 31 by an attendant is utilized to close a switch 110 in a control circuit for opening the gate 32 to discharge the gross of screws from the scale hopper 13 and initiate a new counting cycle. The switch 110 is of the normally open self-contained type supported on the table with its actuator pin 111 disposed adjacent and shiftable by an arm 112 swingable about a vertical pivot 113 on the table. A leaf spring 114 projects horizontally from the arm 112 and beneath the lower end of the hopper chute and, upon engagement by a carton being moved horizontally beneath the chute, is shifted inwardly to swing the arm against the pin and close the switch. This completes a circuit through a timer TD having normally open contacts TD–1 and TD–2 which close quickly to complete a holding circuit around the start switch 110 and an energizing circuit through the open solenoid 43 and normally closed contacts TD–3 which open quickly to interrupt the circuit through the close solenoid 44. As a result, the movable element of the valve 42 is shifted to connect the rod end of the cylinder 36 to the fluid pressure line 41 and the head end to atmosphere so that the piston is shifted and the gate is opened against the action of its spring 34.

When the gate 32 swings open, the gross of screws 11 in the scale hopper 13 slide along the chute 31 and into the carton 29. After a time interval long enough to insure that all of the screws have been discharged from the hopper, the timer TD operates to interrupt its holding circuit and reverse the energization of the solenoids 43 and 44 for connecting the head end of the cylinder 36 to the pressure line 41 and shifting the piston to close the gate. The attendant then removes the filled carton from beneath the chute 31 to permit the start switch 110 to open. In response to opening of the gate and discharge of the gross into the carton, the weight on the scale platform 14 is relieved and the platform rises with an accompanying downward shift of the vanes 21 and 22 and interruption of the light beams between the lamp 20 and the photocells 17 and 18. Both control relays 1R and 2R then are energized through the amplifiers 25 to complete the circuits to the vibrator coil 69 and the bulk feed motor 62 at the contacts 1R–2 and 2R–2. In the energizing circuit for the clutch-brake relay 3R, the contacts 2R–1 of the dribble relay close but the contacts 1R–1 of the bulk relay are open so that the brake winding 98 remains energized and the dribble feed disk 85 is stationary.

To avoid reenergization of the timer TD and opening of the gate 32 during the bulk and dribble feeds, the coil of a safety relay 4R is connected in parallel with the dribble relay 2R. Thus, when the latter is energized, the safety relay also is energized and normally open contacts 4R–1 thereof open to interrupt the timer circuit. Upon deenergization of the dribble relay, the safety relay contacts close to condition the timer circuit for completion by closure of the start switch 110.

As soon as the vibrator coil 69 is energized, screws 11 remaining on the distributor chute 46 at the end of the previous cycle are agitated and commence flowing in a uniform stream over the ledge 47 and into the scale hopper 13. Simultaneously therewith, the feeder cylinder 51 begins to rotate in the direction of the arrow in Fig. 5 and each pocket 52 thereon is moved first past the lower edge of the bottom wall 54 of the bulk hopper 49 where it picks up a batch of screws and then upwardly past the outer edge of one upwardly flaring wall 61 of the feeder chute 50 where the screws fall out of the pocket. The screws of each batch then slide downwardly along the feeder chute and pile onto the upper end portion of the distributor chute. Once on the distributor chute, the screws are agitated and settled lengthwise in rows between the ribs 67 while advancing toward the ledge 47. With the speed of the bulk feed motor 62 and thereby the average rate of delivery of screws to the distributor chute properly adjusted, each row advancing over the ledge is substantially continuous and comprises only a single layer of screws.

During the flow of screws 11 over the distributor ledge 47, the scale platform 14 descends under the increasing weight and the vanes 21 and 22 rise corresponding amounts with respect to the photoelectric cells 17 and 18. Such flow of screws continues at a fast rate until the associated vane 21 has moved far enough to uncover the bulk sensing cell 17 and permit light to impinge on the same. Then, the bulk relay 1R is deenergized and the contacts 1R–2 thereof open to interrupt the circuits for the vibrator coil 69 and the bulk feed motor 62. As soon as the vibrator is deenergized, the flow of screws over the distributor ledge 47 is cut off sharply. To compensate for the screws which are still freely falling in the air between the ledge and the screws already in the scale hopper 13 at the instant of cut-off of the stream of screws, the bulk photoelectric cell 17 is adjusted along its guide 29 for deenergization of the bulk relay 1R when the weight of the screws already in the hopper is equal to the weight of the total number of screws to be delivered by the bulk feed mechanism less the weight of the freely falling screws. By virtue of the substantially continuous and uniform character of the bulk stream and the sharp cut-off thereof obtainable with the abrupt ledge, the total number of screws delivered by the bulk feed mechanism may be brought to within a few screws of the desired gross.

Upon deenergization of the bulk relay 1R, the contacts 1R–1 thereof close to complete the energizing circuit for the clutch brake relay 3R through the then closed dribble relay contacts 2R–1. This results in deenergization of the brake winding 98 by interruption of its circuit at the contacts 3R–2 and energization of the clutch winding 95 through the contacts 3R–1 to couple the dribble disk 85 to its drive motor 94 for advance of the screws one by one past the lower end retainer bar 97 where they gravitate into the scale hopper 13. As the weight of the last screw needed to complete the gross becomes effective in the hopper, the vane 22 rises to uncover the dribble photocell 18 and the dribble relay drops out for interruption of the clutch-brake relay circuit at the contacts 2R–1. The clutch winding 95 then is deenergized and the brake winding is energized to bring the dribble disk to an abrupt stop thereby completing the counting cycle with a gross of screws in the hopper ready for discharge into the next carton.

In one packaging machine constructed as described above, it was possible to package screws varying in length from one-half of an inch to one and one-half inches at the rate of ten gross per minute. The scale used in this machine was model No. 4103-A manufactured by The Exact Weight Scale Co. of Columbus, Ohio and equipped with a double photoelectric cell control. The vibrator 48 and the distributor chute 46 with its supporting housing 71 but without the baffles 67 were manufactured and sold by The Syntron Co. of Homer City, Pennsylvania under model No. FO feeder.

Certain features of the bulk feeding mechanism above described form the subject matter of my co-pending divisional application, Serial No. 848,421 filed October 23, 1959.

I claim as my invention:

1. In a machine for packaging small irregularly shaped articles such as screws, nuts, etc., the combination of, a container for receiving a quantity of the articles to be packaged, a scale having a platform supporting said container and movable vertically to different positions as the number of articles in said container increases, a dribble feed mechanism operable when activated to deliver articles one by one and at spaced intervals into said container, a bulk feed mechanism comprising an elongated carrier having an upwardly facing surface for supporting a multiplicity of articles distributed along the length thereof, said surface terminating in an abrupt ledge positioned above said container for delivering directly thereto the articles advanced along said surface past the ledge, a power actuated feeder for depositing said articles in an uneven stream onto said surface at a point spaced from said ledge, power actuated means coacting with said carrier to agitate the articles thus deposited and, while advancing the same along said surface toward said ledge, rearrange the articles on said surface in a single layer and a plurality of rows disposed side by side whereby to cause a substantially continuous and uniform stream of the articles to gravitate from said ledge, sensing means for detecting the movement of said platform into different positions corresponding respectively to a desired number of articles in said container and to another number less than the desired number, and means controlling said power actuated means and said dribble feed mechanism in response to said sensing means and coacting with the latter to interrupt the operation of the power actuated means and thereby stop the advance of articles over said ledge when said platform reaches said position corresponding to said other number and to cause operation of said dribble feed mechanism until said platform reaches said position corresponding to said desired number.

2. In a machine for packaging small irregularly shaped articles such as screws, nuts, etc., the combination of, a scale having a platform adapted to support a container for the articles to be packaged and movable vertically to different positions as the number of articles in said container increases, a dribble feed mechanism operable when activated to deliver articles one by one and at spaced intervals into said container, a bulk feed mechanism comprising an elongated carrier having an upwardly facing surface for supporting a multiplicity of articles distributed along the length thereof, said surface terminating in an abrupt ledge positioned above said container for delivering directly thereto the articles advanced along said surface past the ledge, a power actuated feeder for depositing said articles in an uneven stream onto said surface at a point spaced from said ledge, power actuated means coacting with said carrier to agitate the articles thus deposited and, while advancing the same along said surface toward said ledge, rearrange the articles on said surface in plurality of rows disposed side by side whereby to cause a substantially continuous stream of the articles to gravitate from said ledge, sensing means for detecting movement of said platform into a position corresponding to a predetermined number of articles in said container, and means controlling said power actuated means and said feeder in response to said sensing means and coacting with the latter to interrupt the operation of the power actuated means and the feeder to terminate said continuous stream abruply when said platform reaches said position.

3. The packaging machine defined in claim 2 in which said power actuated feeder comprises a hopper for containing many times the predetermined number of articles to be packaged, an annular member mounted to rotate about a horizontally disposed axis and including means defining a plurality of angularly spaced pockets opening inwardly from its periphery and each movable therewith from a lower pick-up position within said hopper to an upper discharge position, where the pocket opens downwardly for gravitation of articles therefrom, and guide means disposed beneath said pockets in said upper position thereof and extending to a position above said carrier surface at said point thereof to receive articles gravitating from the pockets and direct the same onto the surface.

4. In a machine for packaging a predetermined number of elongated articles such as screws, the combination of, a frame, a container for receiving a quantity of the articles to be packaged, a scale mounted on said frame and supporting said container for vertical movement to different positions as the number of articles in the container changes, a downwardly inclined chute adapted to support said articles in a row with their axes inclined during advance of the articles down the chute and one by one off of the lower end thereof, a rotary feeder mounted adjacent the lower end of said chute for rotation about an axis substantially perpendicular to the axes of the screws in said chute and for movement of its periphery successively past a receiving position at said lower end of said chute and a discharge position angularly spaced from the receiving position, said feeder picking up said articles one by one at said receiving station and transferring each article to said discharge position where it is released for gravitation with its axis extending upwardly, power actuated mechanism connected to said feeder for rotating the same, a slide supporting said chute, said mechanism and said feeder with said discharge position of the latter disposed above said container for gravitation of articles into the container from such position, means controlling said power actuated mechanism in response to movement of said container while carried by said scale and operating to inactivate the mechanism and thus stop rotation of said feeder and delivery of said articles when the container and scale reach a position corresponding to the desired number of articles in the container, and means mounting said slide on said frame for adjustment up and down relative to the frame and the scale to vary the vertical spacing of said discharge position of said feeder above said container for gravitation of articles of different lengths through substantially the same distance from the feeder to the container.

5. In a machine for packaging a predetermined number of elongated articles such as screws, the combination of, a frame, a container for receiving a quantity of the articles to be packaged, a scale mounted on said frame and supporting said container for vertical movement to different positions as the number of articles in the container changes, dribble feed mechanism adapted to support a plurality of the articles and operable when actuated to advance the same one by one to a discharge position where each article is released for gravitation from the mechanism with the axis of the article inclined, a power operator for actuating said feed mechanism, means controlling said power operator in response to movement of said container while carried by said scale and operating to stop the operator and the advance of articles to said discharge position when the container and scale reach a predetermined position corresponding to a desired number of articles in the container, a slide supporting said feed mechanism with said discharge position of the latter disposed above said container for gravitation of articles into the container from such position, and means mounting said slide on said frame for adjustment up and down relative to the frame to vary the vertical spacing of said discharge position of said feed mechanism above said container for gravitation of articles of different lengths through substantially the same distance from the mechanism to the container.

6. In a machine for packaging a predetermined number of elongated articles such as screws, the combination of, a scale having a platform adapted to support an upwardly opening container for articles to be packaged and movable vertically to different positions as the number of articles in the container increases, power operated dribble feed mechanism adapted to support a plurality of the articles and operable when actuated to advance the same one by one to a discharge position above said container, said mechanism delivering said articles to said discharge position with their axes inclined and releasing the articles at such position for gravitation into the container, means controlling said mechanism in response to movement of said platform and operating to inactivate the mechanism and stop the delivery of articles to said discharge position when the platform reaches a position corresponding to the desired number of articles in said container and means mounting said scale and said feed mechanism for vertical adjustment of one relative to the other to vary the vertical spacing of said discharge position above said container for gravitation of articles of different lengths through substantially the same distance from the mechanism to the container.

(References on following page)

References Cited in the file of this patent

UNITED STATES PATENTS

| | | |
|---|---|---|
| 565,224 | Richards | Aug. 4, 1896 |
| 1,793,169 | Forster | Feb. 17, 1931 |
| 2,141,296 | Ferguson | Dec. 27, 1938 |
| 2,339,832 | Arnold | Jan. 25, 1944 |
| 2,348,372 | Weckerly | May 9, 1944 |
| 2,505,491 | Harper | Apr. 25, 1950 |
| 2,630,312 | Carrier, et al. | Mar. 3, 1953 |
| 2,632,588 | Hoar | Mar. 24, 1953 |
| 2,687,272 | Schieser et al. | Aug. 24, 1954 |
| 2,763,108 | Garrett | Sept. 18, 1956 |
| 2,778,478 | Brook | Jan. 22, 1957 |